Sept. 4, 1956
K. A. KOLLMANN
2,761,276
FLUID COUPLING DEVICE
Filed May 28, 1952
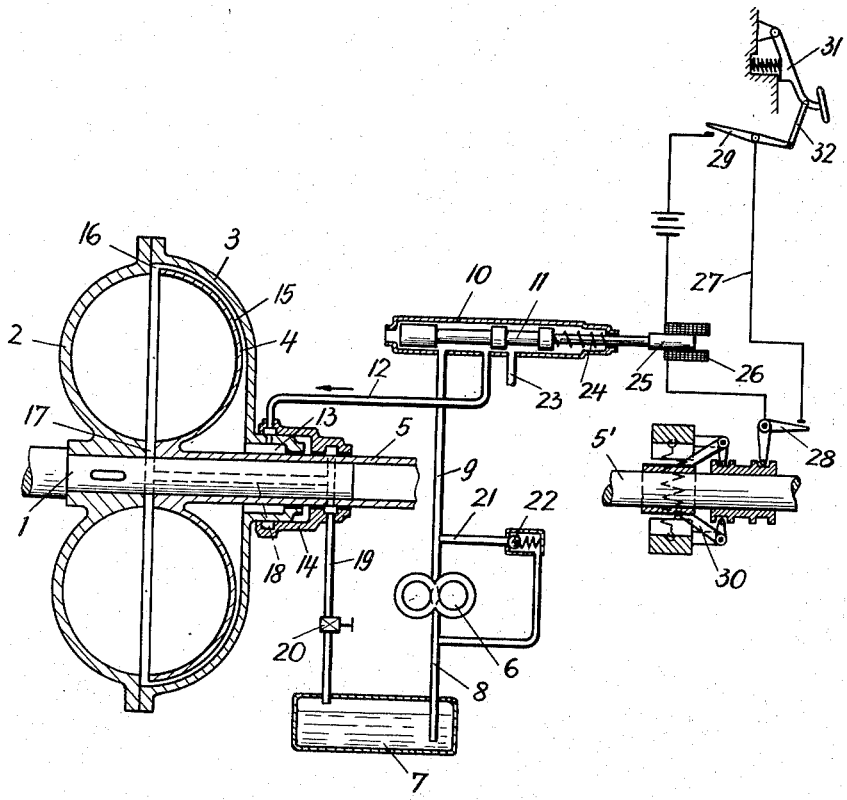
Inventor
Karl A. Kollmann
By Wicke and Padlon
Attorneys

United States Patent Office

2,761,276
Patented Sept. 4, 1956

2,761,276

FLUID COUPLING DEVICE

Karl A. Kollmann, Stuttgart-Bad Cannstatt, Germany, assignor to Daimler-Benz Aktiengesellschaft, Stuttgart-Unterturkheim, Germany Application May 28, 1952, Serial No. 290,607
Claims priority, application Germany June 2, 1951

10 Claims. (Cl. 60—12)

The present invention relates to an arrangement for controlling the so-called "residual torque" in fluid couplings and torque converters and more particularly to an automatic control arrangement for reducing or minimizing this "residual torque" in fluid couplings or torque converters when the engine is adjusted for minimum power output and when the engine or vehicle speed is below a predetermined speed.

Fluid couplings have the property of continuing to transmit some torque, a so-called "residual torque," also under idling conditions so that it becomes impossible to stop the vehicle, particularly in low speeds or gears, without applying the brakes.

Accordingly, it is a particular object of the present invention to obviate the disadvantages in prior art devices caused by the presence of residual torque.

It is a further object of the present invention to reduce or minimize the residual torque present in fluid couplings or torque converters, particularly when the engine idles.

Another object of the present invention resides in a control arrangement which is operative, for example, automatically to reduce the residual torque of a fluid coupling or torque converter when the vehicle or engine speed falls below a predetermined value and when the engine is adjusted to a power output below a predetermined value.

Still another object of the present invention resides in the provision of an arrangement reducing the residual torque in fluid couplings or torque converters which is as simple as possible in construction and as reliable as possible in operation.

It is still another object of the present invention to reduce the residual torque of a fluid coupling or torque converter by emptying the same either partially or completely, and to do so by means of a relatively simple and inexpensive control arrangement.

A further object of the present invention lies in the provision of a simple control arrangement to reduce the residual torque which utilizes only a simple control valve in the inlet line leading to the fluid coupling or torque converter.

Accordingly, the present invention is essentially characterized by the fact that the coupling is automatically emptied, at least in part or completely, when the engine speed or engine power falls below a predetermined point, for instance, by stopping the supply of the fluid to the coupling which itself is connected or inserted into a fluid circulation system.

According to another feature of the present invention, the coupling is emptied depending on the vehicle speed as well as on the engine power, for instance, depending on the position of the gas pedal or carburetor throttle. However, instead of being controlled as a function of two variables, such as vehicle speed and power, the control may also be effected as a function of one of these two variables only. For that purpose, according to a further feature of the present invention, a change-over valve is used which is operated electromagnetically to interrupt or cut off the fluid supply to the coupling from the pump causing the fluid to circulate, and which simultaneously therewith establishes a communication between the interior of the coupling and the open air or atmosphere.

For regulating the "residual torque" or the speed at which the coupling is emptied, according to another feature of the present invention, regulatable throttling devices may be provided in the fluid circulation system, for example, in the oil outlet of the coupling.

The use of slewable "bucket tubes," which do not rotate during operation for purposes of influencing or controlling the slip may be dispensed with by the present invention.

Further objects, features and advantages in accordance with the present invention will become more obvious from the following description when taken in connection with the accompanying drawing which illustrates, for purposes of illustration only, in the single figure one embodiment in accordance with the present invention.

Referring now more particularly to the single figure, reference numeral 1 designates a shaft, for example, the drive shaft of the engine which is drivingly connected with the primary or driving half 2 of the fluid coupling including the coupling cover 3, while the secondary or driven half 4 of the fluid coupling drives the hollow shaft 5 leading to the change-speed transmission. The fluid coupling is inserted or interconnected into a circulatory oil system. The oil is drawn in by a pump 6, for instance, from a tank or reservoir 7 by way of a line 8 and is fed or supplied by way of a line 9 to a cylinder 10 in which a control slide valve 11 is mounted to be axially movable in such a manner that, in the position illustrated in the drawing, the pressure oil delivered by pump 6 may pass by way of line 12 into the annular space 13 between the hub 14 of the coupling cover 3 and the hollow shaft 5, and from there may enter, by way of the annular space 15, the working space of the coupling 2, 4 at the outer circumference 16 thereof. Thus, a feed line from reservoir 7 to the interior working space between the two halves 2, 4, of the coupling is effectively formed by lines 8, 9 and 12 and annular spaces 13 and 15, the pump 6 and the control device 10, 11 being appropriately inserted into such feed line. The oil flows off from the working space of the coupling at 17 along the inner circumference of the working space or along the inner circumference of the blade part of the coupling in the gap formed between the two halves 2 and 4 of the fluid coupling, i. e., at a diameter which is larger than the diameter of shaft 1 or 5 but smaller than the largest effective diameter of the fluid coupling.

The oil flows thereafter through a passage 18 in the shaft 1, a passage in the shaft 5 and a line 19 back to the tank or reservoir 7 or back to the intake side of the pump 6. The cross-section of the oil-return line 19 may be regulated by means of appropriate throttle disks or throttle valves 20 in the line 19. The throttle disks or valves themselves may also be of the interchangeable or adjustable type.

A line 21 with a relief valve 22 serves for the return of oil supplied in excess by an excessive output of the pump 6 from the pressure line 9 back into the intake line 8, thereby preventing too high a pressure in the fluid coupling or allowing drainage of the oil supplied by the pump 6 when the line 9 is closed by the slide valve 11. Furthermore, a line 23 communicating with the open air or atmosphere is provided at the cylinder 10.

The control device of the present invention includes the control slide valve or shut-off member 11 loaded by the spring 24 and connected with an electromagnet 25 operated by a coil 26 connected in a circuit 27. Moreover, two switches 28 and 29 are operatively connected into circuit 27 to interrupt the flow of current when opened. The switch 28 is operated by a speed governor 30 depending on the vehicle speed or driven by a transmission shaft 5', while the switch 29 is connected with the throttle or gas pedal 31 by means of the linkage 32.

What I claim is:

1. A fluid coupling device comprising a hydrodynamic coupling with a primary part and a secondary part encircling and defining an interior space for the working fluid, said interior space having inner and outer circumferences, said parts being provided with means effective for transmitting energy through a fluid medium, a driving member connected with said primary part, a driven member connected with said secondary part, a feed line leading to the interior space of said coupling and connected with said interior space at the outer circumference thereof, a discharge line leading off the interior space of said coupling and connected with said coupling at the inner circumference thereof, control means in said feed line for interrupting the fluid flow from said first-mentioned line through the interior of the coupling through said second-mentioned line, and further means responsive to the driving condition of said driven member for automatically actuating said control means to cut off said fluid flow when one of said members is operating within predetermined limits to thereby at least partially empty said fluid coupling.

2. A fluid coupling device according to claim 1, further comprising a regulatable throttle device in said discharge line.

3. A fluid coupling device according to claim 1, further comprising an oil reservoir, said feed line originating at said oil reservoir and said discharge line returning to said oil reservoir, a pump in said feed line, and a regulatable throttle device in said discharge line.

4. A fluid coupling device according to claim 1 wherein said control means includes an electrical circuit, an electromagnet controlled by said electrical circuit, a shut-off member shiftable by said electromagnet, and a switch member in said electrical circuit operatively connected with said further means to open and close said circuit.

5. A fluid coupling device according to claim 1, wherein said control means includes a shiftable shut-off member operative to connect said feed line to the external atmosphere while shutting off the fluid flow through the interior space of said coupling.

6. A fluid coupling device comprising a hydrodynamic coupling with a primary part and a secondary part encircling and defining an interior space for the working fluid, said interior space having inner and outer circumferences, said parts being provided with means effective for transmitting energy through a fluid medium, a driving member connected with said primary part, a driven member connected with said secondary part, a line leading to the interior space of said coupling, a line leading off the interior space of said coupling, a control device in said first-mentioned line for interrupting the fluid flow from said first-mentioned line through the interior of the coupling through said second-mentioned line, and means responsive to the speed of said driven member for automatically actuating said control device to cut off said fluid flow below a predetermined speed of said driven member to thereby at least partially empty said fluid coupling.

7. A fluid coupling device comprising a hydrodynamic coupling with a primary part and a secondary part encircling and defining an interior space for the working fluid, said parts being provided with means effective for transmitting energy through a fluid medium, a driving member connected with said primary part, a driven member connected with said secondary part, a line leading to the interior of said coupling, another line leading off the interior of said coupling, a control device in said first-mentioned line for interrupting the fluid flow from said first-mentioned line through the interior space of said coupling to said second-mentioned line, and means simultaneously responsive to the speed of said driven member and the available power of said driving member for automatically actuating said control device to interrupt the fluid flow and for emptying said coupling if either the speed of said driven member is below a certain low value or the power available by said driving member is below a certain value.

8. A fluid coupling device comprising a hydrodynamic coupling with a primary and a secondary part encircling and defining an interior space for the working fluid, said parts being provided with means effective for transmitting energy through a fluid medium, a driving engine connected with said primary part, a driven member connected with said secondary part, a feed line leading to the interior space of the coupling, a discharge line leading off the interior space of said coupling, a control member in said feed line for shutting off said feed line and thereby interrupt the flow of the fluid to the interior of said coupling, a speed governor responsive to the speed of said driven member, means operatively connecting said speed governor with said control member for shifting said control member to an at least partial shut-off position when the speed of the driven member is below a predetermined value.

9. A fluid coupling device comprising a hydrodynamic coupling with a primary and a secondary part encircling and defining an interior space for the working fluid, said parts being provided with means effective for transmitting energy through a fluid medium, a driving engine connected with said primary part, a driven member connected with said secondary part, a feed line leading to the interior space of said coupling, a discharge line leading off the interior space of said coupling, a control member in said feed line for shutting off said feed line and thereby interrupting the flow of the fluid to the interior space of said coupling, an electrical circuit, an electromagnet in said coupling, an electrical circuit, an electromagnet in said circuit operated by the current of said circuit and operatively connected with said control member to shift said control member to a shut-off position, a switch in said circuit, a speed governor responsive to the speed of said driven member operatively connected with said switch, another switch in said circuit, and adjusting means for adjusting the power produced by said engine operatively connected with said another switch, whereby said control member is shifted to shut-off position by said electromagnet when said driven member is below a predetermined speed and said adjusting means is adjusted to the idling position of said engine.

10. A fluid coupling device for coupling a driving member continuously variable in speed and power output with a driven member comprising means for normally conditioning said coupling device for transmission of torque between said driving member and said driven member, speed responsive means operatively connected and controlled by one of said two members, adjusting means for controlling the power input to said driving member, and further means operatively connected with said speed responsive means and said adjusting means for rendering essentially inoperative said first-mentioned means to prevent transmission of torque through said coupling device only when said one member is operating below a predetermined speed and the power input to said driving member is below a predetermined value.

References Cited in the file of this patent

UNITED STATES PATENTS

| | | |
|---|---|---|
| 1,855,032 | Sinclair | Apr. 19, 1932 |
| 1,855,222 | Chase | Apr. 26, 1932 |
| 1,859,607 | Sinclair | May 24, 1932 |
| 2,014,944 | Martyrer et al. | Sept. 17, 1935 |
| 2,067,793 | Seibold | Jan. 12, 1937 |
| 2,266,213 | Kattwinkel | Dec. 16, 1941 |
| 2,603,943 | Evernden | July 22, 1952 |
| 2,673,450 | Wolf | Mar. 30, 1954 |